United States Patent
Liu (10) Patent No.: US 9,825,285 B2
(45) Date of Patent: Nov. 21, 2017

(54) METHODS FOR FORMING ELECTRODE MATERIALS FOR LITHIUM-BASED BATTERIES

(71) Applicant: GM GLOBAL TECHNOLOGY OPERATIONS LLC, Detroit, MI (US)

(72) Inventor: Zhongyi Liu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 295 days.

(21) Appl. No.: 14/555,078

(22) Filed: Nov. 26, 2014

(65) Prior Publication Data

US 2016/0149206 A1  May 26, 2016

(51) Int. Cl.

| | |
|---|---|
| *H01M 4/13* | (2010.01) |
| *H01M 4/134* | (2010.01) |
| *H01M 4/485* | (2010.01) |
| *H01M 4/58* | (2010.01) |
| *H01M 4/131* | (2010.01) |
| *H01M 4/38* | (2006.01) |
| *H01M 10/052* | (2010.01) |
| *H01M 4/02* | (2006.01) |

(52) U.S. Cl.
CPC .......... *H01M 4/134* (2013.01); *H01M 4/131* (2013.01); *H01M 4/386* (2013.01); *H01M 4/485* (2013.01); *H01M 4/581* (2013.01); *H01M 10/052* (2013.01); *H01M 2004/027* (2013.01); *Y02T 10/7011* (2013.01)

(58) Field of Classification Search
CPC ...... H01M 4/134; H01M 4/485; H01M 4/581; H01M 4/131; H01M 4/386; H01M 10/052; H01M 2004/027; Y02T 10/7011
USPC .......................................... 429/218.1
See application file for complete search history.

(56) References Cited

U.S. PATENT DOCUMENTS

| | | | |
|---|---|---|---|
| 2013/0209891 A1* | 8/2013 | Neumann | ................ B01J 20/20 429/231.8 |
| 2015/0014890 A1* | 1/2015 | Xiao | .................... H01M 4/0471 264/446 |
| 2015/0325836 A1* | 11/2015 | Neumann | ............. B22F 1/0018 264/29.1 |

* cited by examiner

*Primary Examiner* — Gary Harris

(74) *Attorney, Agent, or Firm* — Harness, Dickey & Pierce, P.L.C.

(57) ABSTRACT

In an example of the method disclosed herein, a precipitate is formed in an aqueous mixture by mixing an $SiO_x$ precursor and an acid. The precipitate and a carbon material are added to a base, and the precipitate dissolves to form a solution having the carbon material therein. Hydrothermal synthesis is performed using the solution, and precursor nanostructures are grown on the carbon material. The precursor nanostructures on the carbon material are annealed so that the carbon material is removed and porous, one-dimensional $SiOx$ ($0<x\leq2$) nanorods are formed.

11 Claims, 7 Drawing Sheets

METHODS FOR FORMING ELECTRODE MATERIALS FOR LITHIUM-BASED BATTERIES

BACKGROUND

Secondary, or rechargeable, lithium ion batteries or lithium-sulfur batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

In an example of a method disclosed herein, a precipitate is formed in an aqueous mixture by mixing an $SiO_x$ precursor and an acid. The precipitate and a carbon material are added to a base, and the precipitate dissolves to form a solution having the carbon material therein. Hydrothermal synthesis is performed using the solution, and precursor nanostructures are grown on the carbon material. The precursor nanostructures on the carbon material are annealed so that the carbon material is removed and porous, one-dimensional $SiO_x$ ($0<x\leq 2$) nanorods are formed.

Examples of the porous, one-dimensional $SiO_x$ ($0<x\leq 2$) nanorods may be used as an additive in a positive electrode of a lithium-sulfur battery, as an active material in a lithium-sulfur battery when exposed to pre-lithiation, or as an active material in a lithium ion battery.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Lithium-sulfur and lithium ion batteries generally operate by reversibly passing lithium ions between a negative electrode (sometimes called an anode) and a positive electrode (sometimes called a cathode). The negative and positive electrodes are situated on opposite sides of a porous polymer separator soaked with an electrolyte solution that is suitable for conducting the lithium ions. Each of the electrodes is also associated with respective current collectors, which are connected by an interruptible external circuit that allows an electric current to pass between the negative and positive electrodes.

For a lithium-sulfur battery, the life cycle may be limited by the migration, diffusion, or shuttling of lithium-polysulfide intermediates ($LiS_x$, where x is $2<x<8$) from the positive electrode through the porous polymer separator, to the negative electrode during the battery discharge process. The lithium-polysulfide intermediates generated at the sulfur-based positive electrode are soluble in the electrolyte, and can migrate to the negative electrode where they react with the negative electrode in a parasitic fashion to generate lower-order lithium-polysulfide intermediates. These lower-order lithium-polysulfide intermediates diffuse back to the positive electrode and regenerate the higher forms of lithium-polysulfide intermediates. As a result, a shuttle effect takes place. This effect leads to decreased sulfur utilization, self-discharge, poor cycleability, and reduced coulombic efficiency of the battery. Without being bound to any theory, it is believed that even a small amount of lithium-polysulfide intermediates forms an insoluble molecule, such as dilithium sulfide ($Li_2S$), that can permanently bond to the negative electrode. This may lead to parasitic loss of active lithium at the negative electrode, which prevents reversible electrode operation and reduces the useful life of the lithium-sulfur battery.

As noted above, the shuttle effect leads to decreased sulfur utilization. This is due to the fact that when the lithium-polysulfide intermediates are formed, the sulfur in the positive electrode is depleted. A reduced amount of sulfur in the positive electrode means that there is less sulfur available for use. The depletion of sulfur also contributes to the limited life cycle of sulfur-based batteries. It is to be understood that the lithium-polysulfide intermediates are referred to herein as polysulfides.

In one example of the method disclosed herein, porous, one-dimensional $SiO_2$ nanorods may be prepared and added as an additive to the positive electrode. In another example of the method disclosed herein, porous, one-dimensional $SiO_x$ ($x<0<2$) nanorods may be prepared and added as an active material to the negative electrode. It is to be understood that $SiO_x$ may be silicon monoxide, silicon dioxide (in instances where it is specifically stated that $0<x\leq 2$), silicon suboxide, or combinations thereof. As used herein, the term "one-dimensional" means that the nanorod has a length (which may be up to several microns) that is much greater than its diameter (which ranges from 20 nm to 300 nm).

Other structures that may be considered one-dimensional include nanowires, nanotubes, and nanofibers.

In the example when the $SiO_2$ nanorods are mixed throughout the positive electrode, this additive is mixed with an active material, a binder, and a conductive filler. In this example, the porous, one-dimensional $SiO_2$ nanorods act as soluble polysulfide reservoirs. More particularly, the soluble polysulfides that form in the positive electrode become trapped in the pores of the porous, one-dimensional $SiO_2$ nanorods. Since the polysulfides are trapped in the positive electrode, the polysulfides are unable to migrate to the negative electrode and to react with the active material in the negative electrode. As a result, the porous, one-dimensional $SiO_2$ nanorods can mitigate the shuttle effect and can increase the amount of sulfur for utilization in the positive electrode, and in turn, can improve the efficiency, life cycle, and self-discharge of sulfur-based batteries.

Furthermore, the high theoretical capacity (e.g., 4200 mAh/g) of silicon renders it desirable for use as a negative electrode active material in lithium-based batteries. However, it has been found that negative electrode active materials (e.g., silicon particles) with high specific capacities also have large volume expansion and contraction during charging/discharging of the lithium-based battery. The large volume change (e.g., about 400%) experienced by the negative electrode active material during charging/discharging causes the negative electrode active material to fracture, decrepitate, or otherwise mechanically degrade, which results in a loss of electrical contact and poor life cycling. Poor cycling performance often includes a large capacity fade, which may result from the breakdown of contact between the negative electrode active material and conductive fillers in the negative electrode due to the large volume change.

Some examples of the method disclosed herein form silicon-based negative electrode active materials that can improve the cycling performance of different examples of the negative electrode. In one example, porous, one-dimensional $SiO_x$ (0<x<2) nanorods may be prepared and used as the active material in the negative electrode of the lithium ion battery. In another example, porous, one-dimensional silicide nanorods may be prepared and used as the active material in the negative electrode of the lithium-sulfur. The porous, one-dimensional silicide nanorods may be formed by pre-lithiating the porous, one-dimensional $SiO_x$ (0<x<2) nanorods. Unlike the porous, one-dimensional $SiO_2$ nanorods used as the additive in the positive electrode to trap polysulfides, the porous, one-dimensional silicide nanorods in the negative electrode are used as active materials to accommodate and release lithium ions, and do not trap polysulfides.

Several of the porous, one-dimensional $SiO_x$ (0<x≤2) nanorods disclosed herein are assembled together so that they resemble a sea urchin. Each of the nanorods is a small spiky extension that extends from a center portion. The spiky extensions may decrease in diameter along the length of the nanorod away from the center portion. Small spaces (i.e., interspaces) may separate one nanorod from another nanorod in the assembly. The morphology of the porous, one-dimensional $SiO_x$ (0<x≤2) nanorods (i.e., lithium ion battery active material) and of the porous, one-dimensional silicide nanorods (i.e., lithium-sulfur battery active material) provides space that can accommodate the volume expansion of the silicon, and thus can reduce the stress on the silicon. It is believed that the interspace among individual porous one-dimensional $SiO_x$ (0<x≤2) nanorods and among individual porous, one-dimensional silicide nanorods contributes to a reduction in fracturing, decrepitating, or mechanical degradation that would otherwise lead to the capacity fading during the charging and discharging process.

Referring now to FIGS. 1A-1F, examples of the method for forming the porous, one-dimensional $SiO_x$ (0<x≤2) nanorods will be discussed. In an example, the method involves, in part, hydrothermal synthesis to form the porous, one-dimensional $SiO_x$ (0<x≤2) nanorods.

Figures 1A, 1B, 1C, 1D, 1E, 1F:
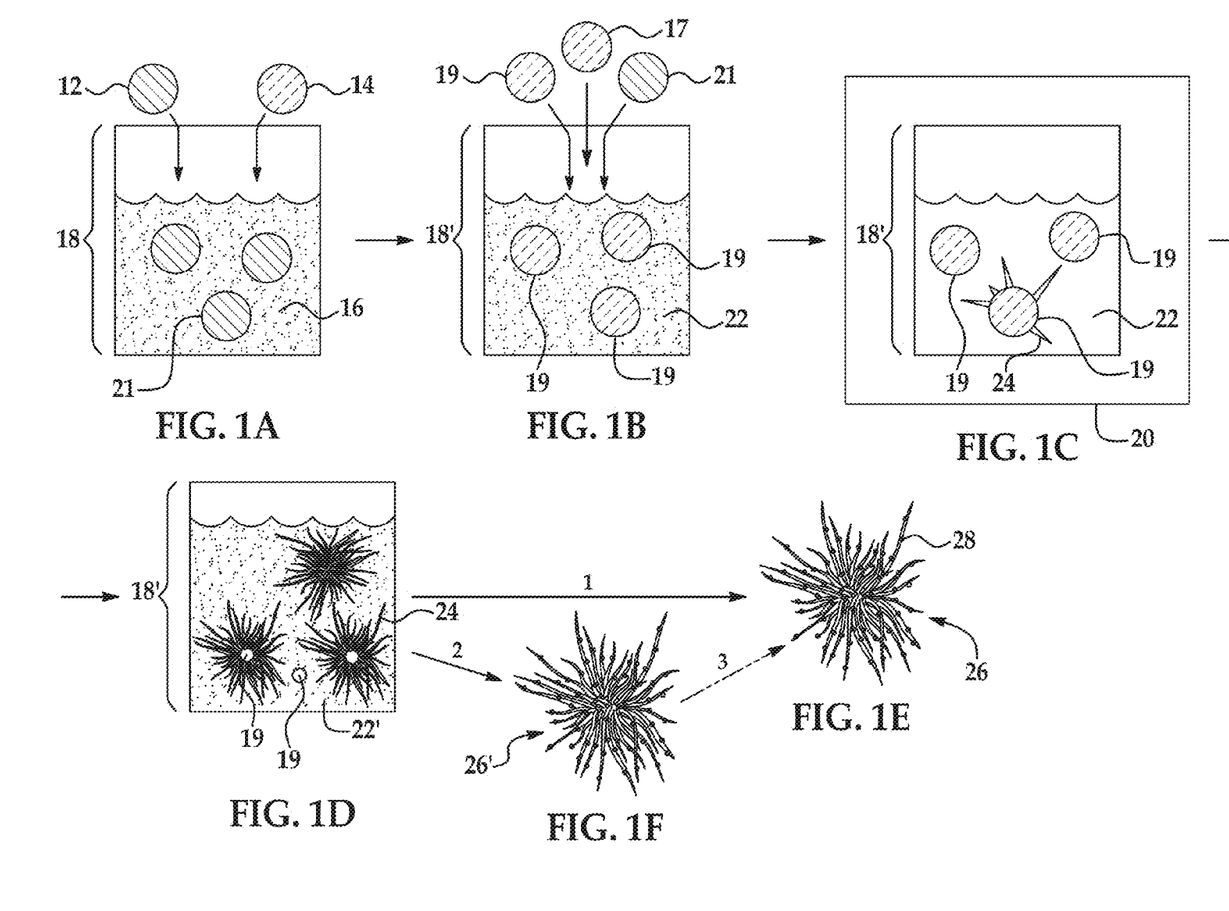
FIGS. 1A-1F are schematic and partially cross-sectional diagrams which together illustrate several examples of the method for forming an example of the one-dimensional $SiO_x$ nanorods disclosed herein.

Turning to FIG. 1A, an aqueous solution 16 is formed by mixing deionized water, the $SiO_x$ precursor 12, and an acid 14 into a container 18. The $SiO_x$ precursor 12 may be sodium metasilicate ($NaSiO_3$) or hydrous sodium metasilicate ($NaSiO_3.6H_2O$). The acid 14 may be hydrochloric acid (HCl) (e.g., 1 M HCl), $H_2SO_4$, $HNO_3$, $H_3PO_4$, or any other suitable acid.

After the $SiO_x$ precursor 12 is added to the deionized water in the container 18, the $SiO_x$ precursor 12 may be thoroughly dissolved by stirring to form the solution 16. In an example, the solution 16 may be stirred for a time ranging from about 5 minutes to about 2 hours. The solution 16 may be mixed using a magnetic stir bar, a stirring rod by hand, or any other suitable means known to a skilled artisan. The acid 14 is then added to the solution 16 until a white precipitate 21 is formed in the solution 16. A salt (e.g., NaCl, $Na_2SO_4$, etc.) is also formed in the solution 16 as a byproduct of the reaction between the $SiO_x$ precursor 12 and the acid 14 (note that the salt is not shown in FIG. 1A). The salt byproduct is soluble in the solution 16, and therefore the salt byproduct is dissolved within the solution 16. Additionally, the salt is removed when the precipitate 21 is separated therefrom.

An example of the precipitate 21 that is formed is $Si(OH)_4$. $Si(OH)_4$ is silicic acid (a water-insoluble acid), which in the examples disclosed herein is a white gelatinous precipitate that is formed in the solution 16. In an example, the $Si(OH)_4$ may be obtained from a reaction of hydrous $Na_2SiO_3$ and 1M HCl. The formed precipitate 21 may be in the form of nanoparticles (i.e., particles having an average diameter ranging from about 1 nm to about 100 nm).

The precipitate 21 that is formed in the solution 16 may be removed from the solution 16 using any suitable separation technique. For example, the precipitate 21 may be removed by vacuum filtration, centrifugal force, or any other suitable means. The precipitate 21 may be washed multiple times with deionized water during and/or after the separation of the precipitate 21 from the solution 16. It may be desirable to wash the precipitate 21 with deionized water before it is used in the hydrothermal synthesis.

After the precipitate 21 is separated from the solution 16 and washed, the precipitate 21 may be dried at a temperature ranging from about 60° C. to about 80° C. for a time ranging from about 12 to about 24 hours.

Referring now to FIG. 1B, an aqueous mixture 22 is formed by mixing deionized water, the precipitate 21, a carbon material 19 and a base 17 into another container 18'. As mentioned above, the precipitate 21 is a water-insoluble acid, but it will react with the base 17 to form a water soluble product (e.g., $Na_2SiO_4$) that dissolves in the deionized water. The hollow carbon 19 may be suspended or dispersed in the deionized water. As such, the aqueous mixture 22 is also referred to herein as the aqueous mixture 22 having the carbon material 19 therein.

Any carbon material 19 that can provide heterogeneous nucleation sites for $SiO_x$ and are inert during hydrothermal synthesis may be used. In an example, the carbon material 19 is hollow carbon or graphite. Hollow carbon can be prepared by thermally oxidizing carbon black. Some examples of suitable commercially available carbon black particles include VULCAN® XC72 (Cabot Corp.), KETJENBLACK® (Akzo Nobel), and Black Pearl (BP2000) (Cabot Corp.). In an example, for every 1 gram of the precipitate 21 that is included in the solution, 0.01 grams of the carbon material 19 may be added.

The carbon material 19 provides heterogeneous nucleation sites during hydrothermal synthesis of the aqueous mixture 22, and thus facilitates the nucleation and growth process of a precursor nanostructure 24 (see FIG. 1D). By providing heterogeneous nucleation sites during hydrothermal synthesis, it is believed that the carbon material 19 increases the yield of the precursor nanostructures 24, and thus ultimately the porous, one-dimensional $SiO_x$ nanorods. The edges and/or cavities of the carbon material 19 provide the nucleation sites for precursor nanostructure 24 growth.

In addition, it is believed that the carbon material 19 may act as a reducing agent to reduce $SiO_2$ to $SiO_x$ or to reduce $SiO_x$ to an even further reduced form of $SiO_x$ during a heat treatment (identified as "2" between FIGS. 1D and 1F) that may take place subsequent to hydrothermal synthesis. This heat treatment 2 is discussed below in reference to FIG. 1F. It is to be understood that the carbon material 19 does not react with the base 17 or the precipitate 21 during the formation of the aqueous mixture 22 or during hydrothermal synthesis. As such, the carbon material 19 provides a substrate for precursor nanostructure 24 growth, but does not interfere with precursor nanostructure 24 growth.

The base 17 is also included in the aqueous mixture 22. The base 17 changes the pH of the aqueous mixture 22 (which may initially be very acidic, pH<5) to a pH ranging from about 5 to about 7 (i.e., less acidic or neutral). Some examples of the base 17 include sodium hydroxide (NaOH), potassium hydroxide (KOH), ammonium hydroxide ($NH_4OH$), or some other base that is suitable for adjusting the pH to the desired level. The base 17 not only adjusts the pH of the aqueous mixture 22, but also reacts with the precipitate 21 before hydrothermal synthesis. The reaction between the precipitate 21 and the base 17 forms a water soluble product, and thus the base aids in dissolving the precipitate 21. It is to be understood that the base 17 may be added before or after the addition of the carbon material 19. As such, the deionized water, the precipitate 21, and the base 17 may be mixed together to dissolve the precipitate 21 and form a solution, and then the carbon material 19 may be added to form the aqueous mixture 22. The reaction between the base 17 and the precipitate 21 is discussed in reference to FIGS. 1C-1D below.

The aqueous mixture 22 is mixed using any suitable technique as previously described in reference to FIG. 1A. For example, the aqueous mixture 22 may be mixed for a time ranging from about 5 minutes to about 2 hours. In an example, the aqueous mixture 22 is mixed for about 30 minutes.

Turning now to FIG. 1C, after mixing the aqueous mixture 22, the aqueous mixture 22 may be added to a closed system 20. In an example, the closed system 20 is an autoclave. Some examples of the autoclave include a polytetrafluoroethylene-lined (e.g., TEFLON®-lined) or copper-lined stainless steel autoclave. A TEFLON®-lined autoclave is used at temperatures below 200° C. A copper-lined autoclave is used at temperatures at or above 200° C.

The hydrothermal synthesis is performed in the closed system 20, as shown in FIG. 1C. More particularly, within the closed system 20, the aqueous mixture 22 is subjected to heat and vapor pressure for a certain amount of time. The temperature of the heat ranges from about 150° C. to about 200° C. The vapor pressure ranges from about 700 psi to about 1380 psi. The heat and vapor pressure are applied for a time ranging from about 24 hours to about 48 hours. In an example, the closed system 20 may be raised to a temperature of about 200° C. for about 24 hours. It is believed the vapor pressure may be around 1000 psi in the closed system 20.

As noted above, the aqueous mixture 22 that is exposed to hydrothermal synthesis has therein a water soluble product that forms from the reaction of the precipitate 21 and the base 17. The application of heat and vapor pressure in the closed system 20 forms a precursor nanostructure 24 from the water soluble product. In an example, the precursor nanostructure 24 is a $SiO_x$ petal or spike (i.e., nanorod) attached to the carbon material 19. Several precursor nanostructures 24 are attached to the carbon material 19, and together the precursor nanostructures 24 form a sea urchin-like nanostructure. This sea urchin-like nanostructure has many solid $SiO_x$ nanorods grown radially and outward from the nucleation sites of the carbon material 19.

In general, during initial mixing of the aqueous mixture 22, it is believed that the cation of the base 17 (e.g., Na from NaOH) participates in a reaction with the precipitate 21 ($Si(OH)_4$), thus forming the water soluble product (e.g., $Na_2SiO_4$). During hydrothermal synthesis, the nucleation of an $SiO_x$ precursor nanostructure 24 initiates at preferential sites (e.g., edges and cavities) on the carbon material 19 from the water soluble product. In other words, seeds of the $SiO_x$ precursor nanostructure 24 are formed initially at the preferential sites on the carbon material 19. As hydrothermal synthesis continues, the $SiO_x$ precursor nanostructure 24 continues to grow. It is to be understood that a small amount of the cation from the water soluble product (and thus from the base 17) may be incorporated into the precursor nanostructures 24 during the hydrothermal synthesis.

As shown in FIG. 1D, after hydrothermal synthesis, several $SiO_x$ precursor nanostructures 24 are grown on a single particle of the carbon material 19. It is believed that at least some of the precursor nanostructures 24 that are formed during hydrothermal synthesis are attached to the hollow carbon 19, as shown in FIG. 1D. Several $SiO_x$ precursor nanostructures 24 may even grow from the same preferential site, and thus may be attached to other $SiO_x$ precursor nanostructures 24. At least some other of the precursor nanostructures 24 that are formed during hydrothermal synthesis are not attached to the hollow carbon 19. In these examples, as the $SiO_x$ precursor nanostructures 24 grow, the $SiO_x$ precursor nanostructures 24 detach from the carbon material 19 surfaces. After the $SiO_x$ precursor nanostructures 24 detach from the carbon material 19 surfaces, the $SiO_x$ precursor nanostructures 24 continue to grow into the sea-urchin like nanostructures.

After hydrothermal synthesis, the precursor nanostructures 24 and the carbon material 19 are removed from the closed system 20 (FIG. 1D), and an ion exchange process is performed (not shown). The ion exchange may take place between the cation of the precursor nanostructure 24 and protons that are introduced to the precursor nanostructure 24. For example and as previously described, the cation from the base 17 may initially react with the precipitate 21 to form a water soluble product including the cation, and the water soluble product forms the precursor nanostructure 24 during hydrothermal synthesis. Cation(s) that may have been incorporated into the precursor nanostructure 24 may be exchanged with protons that are present in an acid, such as HCl (hydrochloric acid), that is introduced to the precursor nanostructure 24. As an example, the precursor nanostructure 24 is removed from the closed system 20 after the closed system 20 is allowed to cool down. The precursor nanostructure 24 is added to a beaker and is stirred while 1M HCl is added. The ion exchange takes place as the HCl is added. In this example, the HCl may be added until the pH reaches about 7.

In one specific example of the method, $NaSiO_3 \cdot 6H_2O$ is the $SiO_x$ precursor 12 and HCl is the acid 14. $NaSiO_3 \cdot 6H_2O$ and 1 M HCl are added to deionized water to form an example of the solution 16. In an example, it is believed that the following reaction (I) takes place to form the precipitate 21:

$$Na_2SiO_3 + 2HCl + H_2O \rightarrow Si(OH)_4 \text{ (solid)} + 2NaCl \quad (I)$$

In this example, $Si(OH)_4$ is the precipitate 21 that is formed. The precipitate 21 is then removed from the solution 16 by vacuum filtration and washed with deionized water. The precipitate 21 may also be dried.

After drying, the $Si(OH)_4$ precipitate 21 is then added to deionized water, along with NaOH as the base 17, to form the aqueous mixture 22. When the $Si(OH)_4$ precipitate 21 is added with the NaOH base 17, the components react to form the water-soluble product. NaOH may be added to form a complete aqueous mixture 22 (i.e., no undissolved $Si(OH)_4$ precipitate 21 remains). In an example, the following reaction (II) occurs when the $Si(OH)_4$ precipitate 21 is added to the base 17:

$$Si(OH)_4 + 4NaOH \rightarrow Na_2SiO_4 \text{ (solution)} + 4H_2O \quad (II)$$

The $Na_2SiO_4$ is an example of the water-soluble product that is formed in the aqueous mixture 22 prior to hydrothermal synthesis.

In this example, hollow carbon is also added, as the carbon material 19, to the aqueous mixture 22. The carbon material 19 may be added before the addition of, or after the addition of, or simultaneously with the precipitate 21 and/or the base 17. It is to be understood that since the hollow carbon 19 does not react with the $Si(OH)_4$ precipitate 21 or the NaOH base 17, it may be added to the aqueous mixture 22 at any time during the formation of the aqueous mixture 22. Once the $Na_2SiO_4$ compound/water-soluble product is formed in the solution 22, the aqueous mixture 22 is placed in the closed system 20, such as an autoclave. Heat and vapor pressure are applied to the closed system 20 to cause the formation of the sea urchin-like $SiO_x$ nanostructures as the precursor nanostructure 24 as previously described. In this particular example, HCl may be used for the ion exchange, to replace any cations from the base 17 with protons.

After the reaction(s) take place in the closed system 20 and the system used for ion exchange, it is to be understood that the aqueous mixture 22 has been altered (denoted by reference numeral 22' in FIG. 1D), and at least includes the precursor nanostructure 24 has formed the sea urchin-like morphology as previously described. At least some deionized water is present in the aqueous mixture 22'. In some instances, other ions, such as $Na^+$ or $Cl^-$, and $K^+$ or $NH^+$ may also be present.

After hydrothermal synthesis and ion exchange, the precursor nanostructure 24 may then be removed from the aqueous mixture 22' using any separation technique previously disclosed in reference to FIG. 1A. After the precursor nanostructure 24 is washed, the precursor nanostructure 24 may be dried at a temperature ranging from about 60° C. to about 80° C. for a time ranging from about 12 to about 24 hours.

The dried precursor nanostructures 24 may then undergo different examples of heat treatments to form the porous, one-dimensional $SiO_2$ nanorods 26 or porous, one-dimensional $SiO_x$ (0<x<2) nanorods 26'. The different examples of the heat treatments are labeled "1", "2", and "3" between FIGS. 1D, 1E and/or 1F. It is to be understood that the porous, one-dimensional $SiO_2$ nanorods 26 may be used as an additive in a positive electrode of a lithium-sulfur battery. In addition, the porous, one-dimensional $SiO_x$ (0<x<2) nanorods 26' may be used as an active material in a negative electrode of a lithium ion battery or an active material in a pre-lithiated negative electrode of a lithium-sulfur battery.

In reference to FIG. 1E, in an example, a subsequent heat treatment (labeled "1") may be applied to the dried precursor nanostructures 24 (i.e., the $SiO_x$ petals or solid nanorods). The heat treatment 1 is an annealing process (i.e., heating followed by slow furnace cooling) that is performed in air or another oxygen-containing environment. The heat treatment 1 may be applied for a time ranging from about 2 hours to about 5 hours at a temperature ranging from about 250° C. to about 550° C. In an example, the heat treatment 1 is applied at 550° C. for about 5 hours. During the heat treatment, the $SiO_2$ nanorods 26 and the pores 28 are formed. In particular, the air acts as an oxidizing environment for the $SiO_x$ precursor nanostructures 24, and thus the $SiO_x$ forms the $SiO_2$ nanorods 26. The heat treatment 1 also dehydrates the precursor nanostructures 24 by evaporating water. The water vaporization generates three-dimensional interconnected pores 28 throughout the $SiO_2$ nanorods 26. In addition, during the heat treatment 1, the carbon material 19 is burned off, leaving the porous, one-dimensional $SiO_2$ nanorods 26 in a sea-urchin like configuration/morphology (see FIG. 6). The porous, one-dimensional $SiO_2$ nanorods 26 are connected at the center of the structure.

In an example, during the heat treatment 1, the following reactions (III, IV) occur between hollow carbon 19 and $SiO_x$ precursor nanostructures 24 to form the porous, one-dimensional $SiO_2$ nanorods 26:

$$SiO_x + O_2 \text{ (from air)} \rightarrow SiO_2 \quad (III)$$

$$C + O_2 \text{ (from air)} \rightarrow CO_2 \uparrow \quad (IV)$$

$SiO_x$ precursor nanostructures 24 may be oxidized to form $SiO_2$ (reaction III). The hollow carbon burns off, as shown in reaction (IV).

Heat treatment 1 may be a more efficient route for obtaining $SiO_2$, for example, than performing both treatments 2 and 3.

In reference to FIG. 1F, in another example (labeled "2"), the dried precursor nanorods 24 are placed in an inert or reducing environment in order to prevent any undesirable side reactions with oxygen from taking place (not shown in FIG. 1F). In an example, argon gas, nitrogen gas, or any other inert gas may be used to create the inert environment to avoid undesired oxidation at elevated temperatures. As an example for a reducing environment, 10% $H_2$ is mixed with 90% argon gas or nitrogen gas to form the reducing environment.

Once the precursor nanorods 24 are in the inert or reducing environment, a heat treatment 2 may be applied to the precursor nanorods 24 to form the porous, one-dimensional $SiO_x$ (0<x<2) nanorods 26'. For examples, when the inert environment is used, the carbon material 19 may act as a reducing agent during this heat treatment 2; and when the reducing environment is used, the carbon material 19 and the environment may act as reducing agents during this heat treatment 2. In these examples, the $SiO_x$ precursor nanorods 24 are further reduced. As such, the reaction in the inert or reducing environment leads to the formation of the porous, one-dimensional SiO$_x$ nanorods 26' where 0<x<2. The heat treatment 2 may be applied for a time ranging from about 2 hours to about 5 hours at a temperature ranging from about 800° C. to about 1100° C. In an example, the heat treatment is applied at 1000° C. for 3 hours. It is believed that the following reduction reactions (V) and (VI) occur at temperatures at or above 1000° C.:

$$SiO_2 + 2C \rightarrow Si + 2CO\uparrow \qquad (V)$$

$$SiO_2 + xC \rightarrow SiO_{2-x} + xCO\uparrow \qquad (VI)$$

X is 0<x<2 in reactions (V) and (VI). The carbon material 19 is the main reducer in reactions (V) and (VI). The H$_2$ gas may, in some instances, participate in the reduction reactions.

As mentioned above, porous, one-dimensional SiO$_x$ nanorods 26' have 0<x<2. If it is desirable to form porous, one-dimensional SiO$_2$ nanorods 26 from the porous, one-dimensional SiO$_x$ nanorods 26', an additional heat treatment 3 (from FIG. 1F to FIG. 1E) in air or another oxygen-containing environment may be performed. This additional heat treatment 3 in air or another oxygen-containing environment may be performed as previously described herein in reference to FIG. 1E. This will form the porous, one-dimensional SiO$_2$ nanorods 26.

If the oxygen is insufficient in the heat treatment 3, the following reaction (VII) may occur, where silicon (formed from the previous reduction during step 2) is oxidized, but not enough to form porous, one-dimensional SiO$_2$ nanorods 26:

$$2Si + xO_2 \rightarrow 2SiO_x \ (0 < x < 2) \qquad (VII)$$

It is to be understood that x may be nonstoichiometric when O$_2$ is insufficient. This leads to the formation of silicon suboxide.

Figure 6:
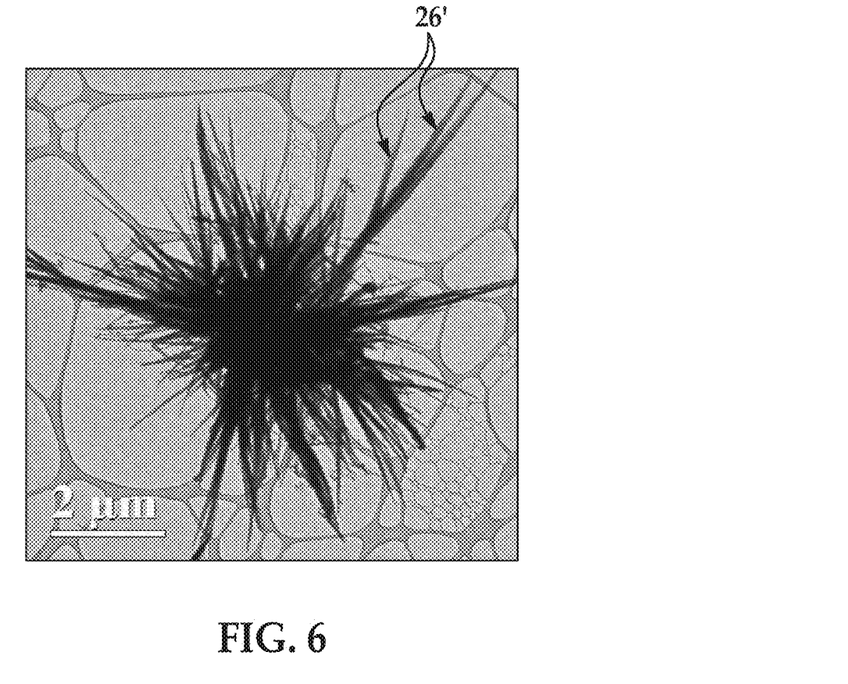
FIG. 6 is a transmission electron microscope ("TEM") image, using a scalar bar of 2 μm, of examples of the porous, one-dimensional $SiO_x$ nanorods formed from an example of the method disclosed herein.
Figure 7:
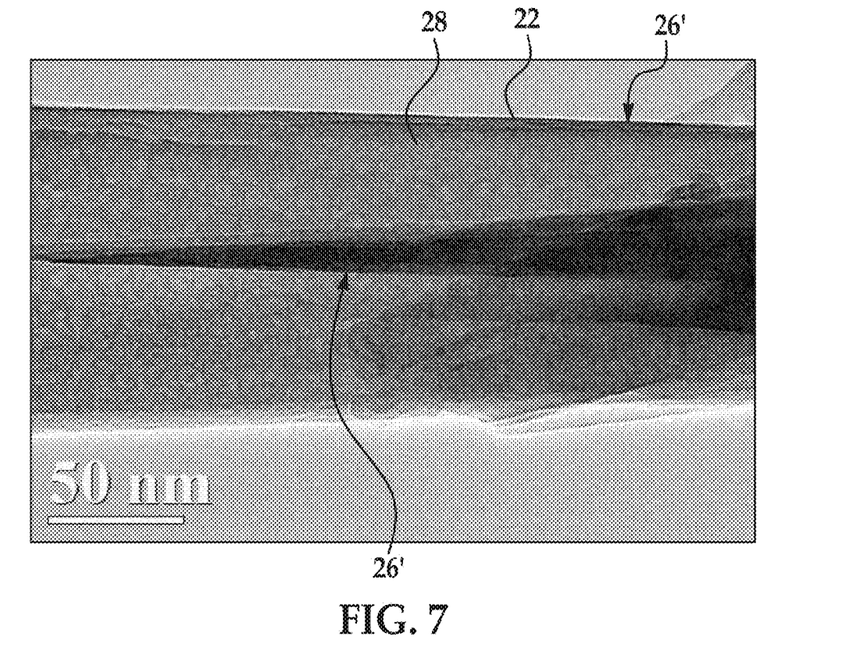
FIG. 7 is a TEM image, using a scalar bar of 50 nm, of a few of the one-dimensional $SiO_x$ nanorods shown in FIG. 6.

Examples of the morphologies of the final porous, one-dimensional SiO$_x$ nanorods 26' are shown in FIGS. 6 and 7. As shown in FIG. 6, a plurality of the SiO$_x$ nanorods 26' are assembled together as a sea-urchin like nanostructure. A description of how these nanorods were formed is set forth in the examples section. In addition, the porous, one-dimensional SiO$_x$ nanorods 26' are further described in the examples section in reference to FIG. 8, which provide Raman spectroscopy results for the porous, one-dimensional SiO$_x$ nanorods 26' and for a comparative example of silicon.

In an example of the porous, one-dimensional SiO$_x$ nanorods 26, 26' (0<x≤2), the three-dimensional pores 28 have a diameter within the porous, one-dimensional SiO$_x$ nanorods 26, 26' (0<x≤2). In an example, the diameter of the pores 28 ranges from about 2 nm to about 6 nm. When used in a positive electrode of a lithium-sulfur battery, the three-dimensional structure of the pores 28 essentially creates a polysulfide reservoir, and thus enhances the ability of the porous, SiO$_2$ nanorods 26 to capture the polysulfides within the positive electrode. When used in a negative electrode of a lithium-sulfur battery or a lithium ion battery, the pores 28 of the porous, one-dimensional SiO$_x$ nanorods 26' (0<x<2) enhance the mechanical strength of the active material by providing additional space that can accommodate volume expansion.

FIGS. 1E and 1F schematically and respectively illustrate one porous, one-dimensional SiO$_2$ nanorods 26 and SiO$_x$ nanorods 26'. Each of the porous, one-dimensional nanorods 26, 26' has a diameter ranging from about 10 nm to about 100 nm. The length of each of the porous, one-dimensional nanorods 26, 26' ranges from about 80 nm to about 3 microns. The diameter of the nanorod 26, 26' may decrease along its length so that the nanorod ends in a point, or has a spiked structure. It is to be understood that each of the porous, one-dimensional nanorods 26, 26' have a diameter that is much less than its length, thus making it one-dimensional. The one-dimensional structure of the nanorods 26, 26' has a larger surface when compared to a metal oxide nanoparticle (which may be considered to be zero-dimensional because it is essentially a point). In an example, the surface area of each of the porous, one-dimensional nanorods 26, 26' ranges from about 130 m$^2$/g to about 200 m$^2$/g. In comparison, nanoparticles generally have a surface area ranging from greater than 0 m$^2$/g to about 100 m$^2$/g. The larger surface area in the examples disclosed herein provides an increased area for trapping polysulfides or transition metal cations as an additive in the positive electrode.

In addition and as mentioned above, the sea urchin-like morphology of the porous, one-dimensional SiO$_2$ and SiO$_x$ nanorods 26 and 26' provides a larger void space among the individual nanorods. As such, the porous, one-dimensional SiO$_x$ nanorods 26' assembled like a sea urchin are able to accommodate the volume expansion during lithiation to reduce mechanical degradation of the active material in the negative electrode. In some instances, the porous, one-dimensional nanorods 26' enhance the mechanical strength of the negative electrode when compared to a negative electrode made with metal oxide nanoparticles.

During the fabrication of the positive or negative electrode, some of the porous, one-dimensional nanorods 26, 26' may fragment from the sea urchin-like nanostructure into individual nanorods. When this happens, the coating quality of a mixture including the one-dimensional nanorods 26, 26' may be improved because at least some of the nanorods 26, 26' can lie down laterally with respect to a surface of a current collector on which the mixture is applied during electrode formation. This orientation improves the mechanical strength of the resulting electrode.

In some instances, the porous, one-dimensional nanorods 26, 26' may be doped. Doping may not be desirable if a more rigid structure is desirable. In an example, the doping agent may be added by a subsequent hydrothermal synthesis process. Alternatively, the doping agent may be added to the solution 22 during the initial hydrothermal synthesis. In this example, a subsequent hydrothermal synthesis process would not be used. As an example of the subsequent hydrothermal synthesis process, the porous, one-dimensional nanorods 26, 26' are added to an acid or deionized water containing the doping agent. This mixture may be sealed in the closed system 20, such as a TEFLON®-lined stainless steel autoclave. The mixture is then subjected to an additional hydrothermal treatment at a temperature ranging from about 150° C. to about 200° C. for a time ranging from about 12 hours to about 24 hours.

In an example, the dopant is present in the acid or water in an amount ranging from about 0.01 mol % to about 1 mol %. The doping agent is selected from the group consisting of chromium ions, vanadium ions, zirconium ions, niobium ions, yttrium ions, silicon ions, and lanthanum ions. It is believed that adding a doping agent to the porous, one-dimensional nanorods 26, 26' enhances the electrical conductivity and further stabilizes the structure of the porous, one-dimensional nanorods 26, 26'.

After obtaining the porous, one-dimensional SiO$_2$ nanorods 26, the porous, one-dimensional SiO$_2$ nanorods 26 may be added, as an additive, to a positive electrode composition of a lithium-sulfur battery. The positive electrode composition includes at least an active material. This is described in further detail in reference to FIG. 2.

Figure 2:
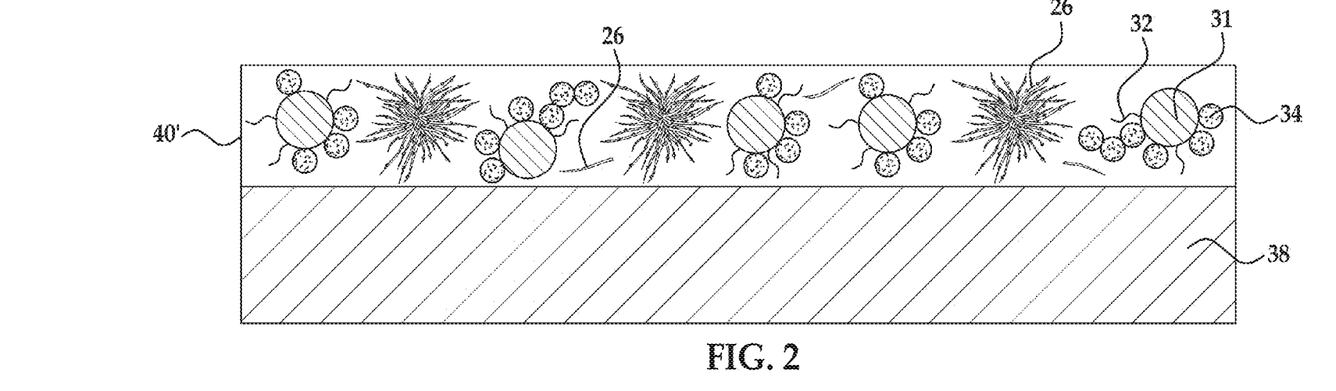
FIG. 2 is a cross-sectional view of an example of a positive electrode on a current collector.

An example of the method for preparing a positive electrode 40' of a lithium-sulfur battery 500 (see FIG. 5) will now be discussed in reference to FIG. 2. FIG. 2 depicts an example of a positive electrode 40' including a sulfur-based active material 31, a binder 32, a conductive filler 34, and the porous, one-dimensional $SiO_2$ nanorods 26 as an additive, on a support 38.

In examples of preparing the positive electrode 40', the one-dimensional $SiO_2$ nanorods 26 are mixed with other positive electrode components in deionized water or an organic solvent depending on the binder 32 selected to form a dispersion or mixture. It is to be understood that the one-dimensional $SiO_2$ nanorods 26 are not embedded within the other positive electrode components.

The sulfur-based active material 31 may be any sulfur material that can sufficiently undergo lithium alloying and dealloying with aluminum or another suitable current collector 38 functioning as the positive terminal of the lithium-sulfur battery 500. An example of the sulfur based active material 31 may be a sulfur-carbon composite. In an example, the amount of sulfur in the sulfur-carbon composite ranges from about 20 wt % to about 95 wt %.

As mentioned above, the sulfur-based active material 31 may be intermingled with the binder 32 and the conductive filler 34. Suitable binders 32 include carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, polyvinyl alcohol (PVA), polyimide, poly (acrylamide-co-diallyl dimethyl ammonium chloride), sodium alginate, polyvinylidene fluoride (PVdF), polyethylene oxide (PEO), an ethylene propylene diene monomer (EPDM) rubber, or other water-soluble or organic solvent-based binders.

The binder 32 structurally holds the sulfur-based active material 31 and the conductive filler 34 together.

An example of the conductive filler 34 is a high surface area carbon, such as acetylene black or activated carbon. Other examples of suitable conductive fillers 34 include graphene, graphite, carbon nanotubes, and/or carbon nanofibers. The conductive filler 34 ensures electron conduction between the positive-side current collector 38 and the sulfur-based active material 31 in the positive electrode 40'. In an example, the positive electrode 40' may also be encapsulated within hollow carbon.

In an example, the porous, one-dimensional $SiO_2$ nanorods 26 are mixed with the binder 32, the conductive filler 34, and the sulfur-based active material 31. All of the components may be manually mixed by dry-grinding. After all the components are ground together, the ground components are added with water or organic solvent (depending on the binder 32 used) to form the dispersion/mixture. In an example, the solvent is a polar aprotic solvent. Examples of suitable polar aprotic solvents include dimethylacetamide (DMAc), N-methyl-2-pyrrolidone (NMP), dimethylformamide (DMF), dimethylsulfoxide (DMSO), or another Lewis base, or combinations thereof. When a water soluble binder, such as sodium alginate, is used, the solvent may be water. The dispersion/mixture may be mixed by milling. Milling aids in transforming the dispersion/mixture into a coatable slurry. Low-shear milling or high-shear milling may be used to mix the dispersion/mixture. The dispersion/mixture milling time ranges from about 10 minutes to about 20 hours depending on the milling shear rate. In an example, a rotator mixer is used for about 20 minutes at about 2000 rpm to mill the dispersion/mixture.

In one example of the dispersion/mixture, the amount of the sulfur-based active material 31 ranges from about 50 wt % to about 95 wt % (based on total solid wt % of the dispersion/mixture), the amount of the conductive filler 34 ranges from about 5 wt % to about 20 wt % (based on total solid wt % of the dispersion/mixture), the amount of the binder 32 ranges from about 5 wt % to about 20 wt % (based on total solid wt % of the dispersion/mixture), and the amount of the porous, one-dimensional $SiO_2$ nanorods 26 ranges from greater than 0 wt % up to about 2 wt % (based on the total solid wt % of the dispersion/mixture).

The slurry is then deposited onto the support 38. In an example, the support 38 is the positive-side current collector. It is to be understood that the support 38 may be formed from aluminum or any other appropriate electrically conductive material known to skilled artisans. The support 38 that is selected should be capable of collecting and moving free electrons to and from an external circuit connected thereto.

The slurry may be deposited using any suitable technique. As examples, the slurry may be cast on the surface of the support 38, or may be spread on the surface of the support 38, or may be coated on the surface of the support 38 using a slot die coater.

The deposited slurry may be exposed to a drying process in order to remove any remaining solvent. Drying may be accomplished using any suitable technique. For example, the drying is conducted at ambient conditions (i.e., at room temperature, about 18° C. to 22° C., and 1 atmosphere). Drying may be performed at an elevated temperature ranging from about 50° C. to about 80° C. In some examples, vacuum may also be used to accelerate the drying process. As one example of the drying process, the deposited slurry may be exposed to ambient drying for about 12 to about 24 hours, followed by vacuum drying at about 70° C. for about 20 minutes to about 1 hour.

The drying process results in a coating formed on the surface of the support 38. This coating is the positive electrode 40'. In an example, the thickness of the dried slurry (i.e., positive electrode 40') ranges from about 5 μm to about 200 μm. In another example, the thickness of the dried slurry (i.e., positive electrode 40') ranges from about 10 μm to about 100 μm.

During the formation of the positive electrode 40', the water and/or organic solvent(s) is/are removed, and thus the resulting positive electrode 50 includes from about 50 wt % to about 95 wt % (based on total wt % of the positive electrode 40') of the active material(s) 31, from about 5 wt % up to 20 wt % (based on total wt % of the positive electrode 40') of the conductive filler 34, from about 5 wt % up to 20 wt % (based on total wt % of the positive electrode 40') of the binder 32, and from greater than 0 wt % up to about 2 wt % (based on the total wt % of the positive electrode 40') of the porous, one-dimensional $SiO_2$ nanorods 26.

Figure 3:
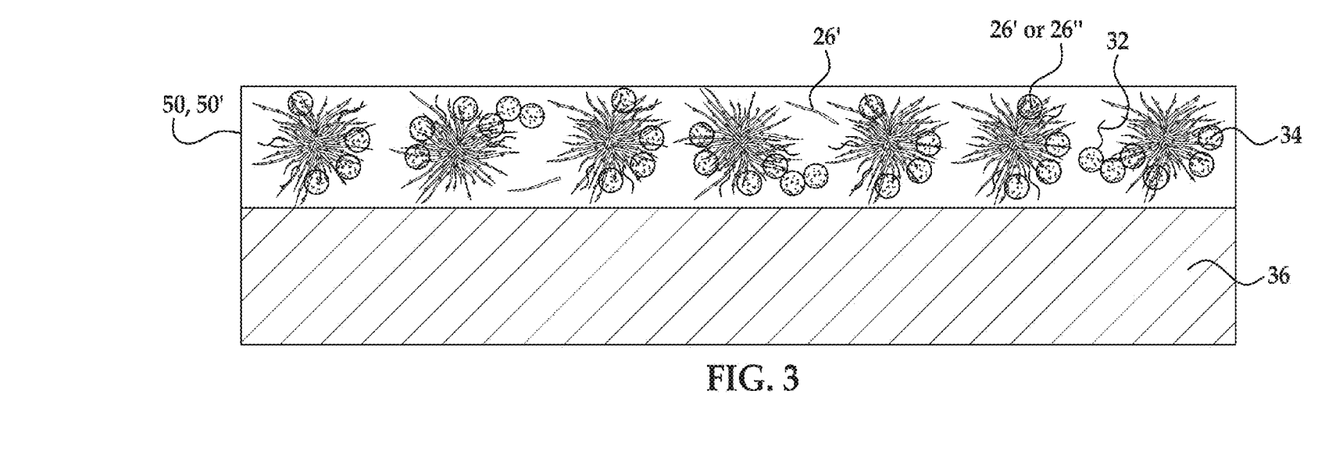
FIG. 3 is a cross-sectional view of an example of a negative electrode on a current collector.
Figure 4:
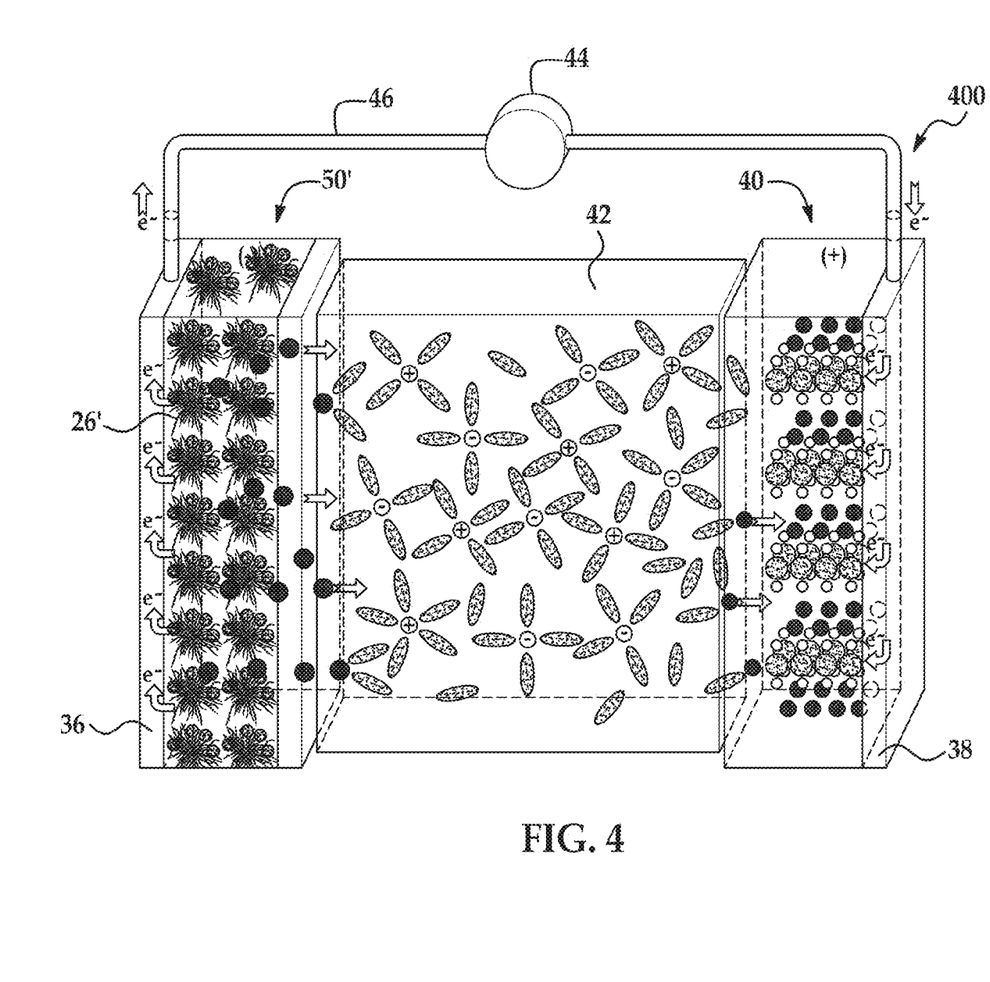
FIG. 4 is a perspective schematic view of an example of a lithium ion battery, including an example of the negative electrode disclosed herein.
Figure 5:
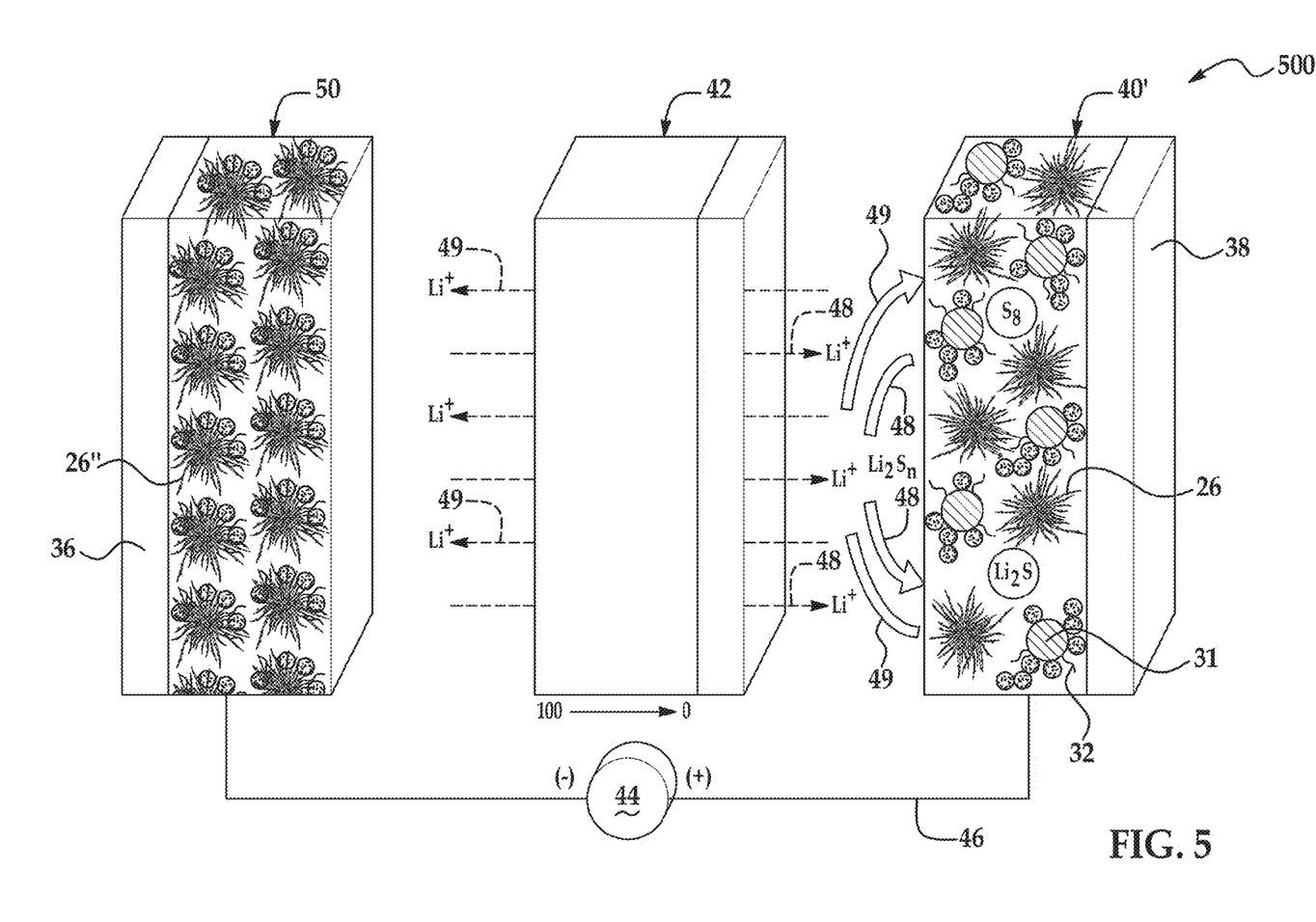
FIG. 5 is a perspective schematic view of an example of a lithium-sulfur battery, including an example of the negative electrode disclosed herein.

Referring now to FIG. 3, the porous, one-dimensional $SiO_x$ (0<x<2) nanorods 26', which may or may not include a doping agent 30, may be added, as an active material, to a negative electrode composition of a lithium ion battery 400 (shown in FIG. 4) or a lithium-sulfur battery 500 (shown in FIG. 5). It is to be understood that the porous, one-dimensional $SiO_x$ (0<x<2) nanorods 26' formed from the methods disclosed herein, may each be used individually, or in combination, as the active material in the negative electrodes 50, 50'. When used in the negative electrode 50' of the lithium ion battery 400, the porous, one-dimensional $SiO_x$ (0<x<2) nanorods 26' may be used as they are formed from the methods disclosed herein. When used in the negative electrode 50 of the lithium-sulfur battery 500, the negative electrode 50 (and thus the porous, one-dimensional $SiO_x$ (0<x<2) nanorods 26') may be exposed to pre-lithiation to form porous, one-dimensional silicide nanorods 26". FIG. 3 depicts an example of the negative electrode the negative electrode 50' including the active material 26', the binder 32, and the conductive filler 34 on the support 36 and an example of the negative electrode 50 including the active material 26", a binder 32, and a conductive filler 34 on a support 36.

In examples of preparing the negative electrode 50', the active material 26' and/or 26" is mixed with other negative electrode components to form a dispersion or slurry. Examples of the other negative electrode components may include the binder 32 and the conductive filler 34.

Examples of the binder 32 and conductive filler 34 include any of the materials previously disclosed herein in reference to FIG. 2 for the positive electrode 40' of the lithium-sulfur battery 500. The porous, one-dimensional $SiO_x$ (0<x<2) nanorods 26' may be mixed, as the active material, with the binder 32 and the conductive filler 34 using the same method as previously disclosed herein in reference to FIG. 2 for the positive electrode 40' of the lithium-sulfur battery 500.

In one example of the dispersion/mixture, the amount of the active material 26' ranges from about 50 wt % to about 95 wt % (based on total solid wt % of the dispersion/mixture), the amount of the conductive filler 34 ranges from about 5 wt % to about 20 wt % (based on total solid wt % of the dispersion/mixture), and the amount of the binder 32 ranges from about 5 wt % to about 20 wt % (based on total solid wt % of the dispersion/mixture).

The slurry is then deposited onto the support 36. In an example, the support 36 is the negative-side current collector. It is to be understood that the support 36 may be formed from copper or any other appropriate electrically conductive material known to skilled artisans. The support 36 that is selected should be capable of collecting and moving free electrons to and from an external circuit connected thereto.

The slurry may be deposited and dried using the same methods previously disclosed herein in reference to FIG. 2 for the positive electrode 40' of the lithium-sulfur battery 500.

The drying process results in a coating formed on the surface of the support 36. This coating is the negative electrode 50'. In an example, the thickness of the dried slurry (i.e., negative electrode 50') ranges from about 5 μm to about 200 μm. In another example, the thickness of the dried slurry (i.e., negative electrode 50') ranges from about 10 μm to about 100 μm.

During the formation of the negative electrode 50', the water and/or organic solvent(s) is/are removed, and thus the resulting negative electrode 50' includes from about 50 wt % to about 95 wt % (based on total wt % of the negative electrode 50') of the active material(s) 26', from about 5 wt % up to 20 wt % (based on total wt % of the negative electrode 50') of the conductive filler 34, and from about 5 wt % up to 20 wt % (based on total wt % of the negative electrode 50') of the binder 32.

The negative electrode 50' may be used as is in the lithium ion battery 400, or it may be pre-lithiated, as will be described below in reference to negative electrode 50.

Negative electrode 50 is particularly suitable for the lithium-sulfur battery 500 because the negative electrode 50 is exposed to pre-lithiation, which converts the porous, one-dimensional $SiO_x$ (0<x<2) nanorods 26' (which is an additive capable of trapping polysulfides) to porous, one-dimensional silicide nanorods 26" (which is an active material that may enhance ion transport). It is believed that the porous, one-dimensional silicide nanorods 26" have a faster lithium ion diffusion rate when compared to silicon active materials with a zero-dimensional particle morphology. It is believed this is due, in part, to the one-dimensional morphology having a shorter diffusion length.

The negative electrode 50 may be formed i) using the techniques, ii) with the binder 34 and conductive filler 32 materials, and iii) using the amounts previously described for the negative electrode 50'.

Prior to being used as the negative electrode 50' in the lithium-sulfur battery 500 (FIG. 5) the example of the negative electrode 50 disclosed herein is pre-lithiated to transform the porous, one-dimensional $SiO_x$ (0<x<2) nanorods 26' into the active material 26". In an example, the active material 26" that is formed includes porous, one-dimensional silicide nanorods 26". An example of the silicide nanorods 26" are lithium silicide ($Li_{4.4}Si$) nanorods 26". It is believed that during lithiation, a series of phase transitions occur to produce the silicide nanorods 26". It is believed that during these phase transitions, amorphous $Li_xSi$ may be formed first. Then, as lithium continues to be added during the pre-lithiation, the amorphous $Li_xSi$ crystallizes to form $Li_{22}Si_5$ (i.e., $Li_{4.4}Si$).

In an example, the negative electrode 50 is pre-lithiated using a lithium-silicon (Li—Si) half-cell method. More specifically, the Li—Si half-cell is assembled using the silicon-based negative electrode 50. The Li—Si half-cell is soaked in a pre-lithiation electrolyte.

Examples of the pre-lithiation electrolyte include lithium metal or a lithium salt dissolved in a solvent or solvent mixture. As examples, the lithium salt may be $LiPF_6$, $LiBF_4$, $LiClO_4$, $LiN(SO_2CF_3)_2$ (LiTFSI, or (Lithium Bis(Trifluoromethanesulfonyl)Imide)), $LiB(C_2O_4)_2$ (LiBOB), $LiBF_2(C_2O_4)$ (LiODFB), $LiPF_4(C_2O_4)$ (LiFOP), $LiNO_3$, $LiN(SO_2F)_2$ (LiFSI), $LiPF_3(C_2F_5)_3$ (LiFAP), $LiPF_4(CF_3)_2$, $LiPF_3(CF_3)_3$, and combinations thereof. In an example, the lithium salt in the pre-lithiation electrolyte is 1M $LiPF_6$.

In an example, the lithium salt or the lithium metal is dissolved in a solvent mixture of dimethoxyethane (DME) and fluoroethylene carbonate (FEC). The volume to volume ratio of the solvents (DME to FEC) ranges from 10 to 1 to 1 to 10. In an example, the volume to volume ratio of DME to FEC is 3 to 1. It has been found that using FEC as a co-solvent forms a desirable solid electrolyte interphase (SEI) layer (not shown in FIG. 4) on the exposed surface(s) of the silicon-based negative electrode 50 during the pre-lithiation process. The FEC is active and readily decomposes during pre-lithiation to form the SEI layer. In another example, diethylene glycol (DEC) and FEC may be used as the solvent mixture to dissolve the lithium metal. The volume to volume ratio of these solvents (DEC to FEC) also ranges from 10 to 1 to 1 to 10. In an example, the volume to volume ratio of DEC to FEC is 3 to 1.

A voltage potential is applied to the half-cell, which causes at least some component in the electrolyte to decompose. The decomposition product deposits on the exposed surface(s) of the negative electrode 50 to form the SEI layer. The decomposition product may be LiF, $Li_2CO_3$, $Li_xPF_yO_z$, F-replaced Lithium Ethylene Di Carbonate (F-LEDC), an unsaturated polyolefin, etc. The voltage potential is applied for a time sufficient to form the SEI layer. In an example, when a higher current is used, the exposure time may be shorter. Similarly, when a lower current is used, the exposure time may be longer. The SEI layer may have a thickness of about 10 nm or less.

In another example, the negative electrode 50' may be pre-lithiated by short circuiting lithium-silicon having the previously described pre-lithiation electrolyte positioned therebetween. This may be accomplished for a time period ranging from about 1 hour to about 24 hours.

During pre-lithiation, lithium ions are dissolved (or de-plated) from lithium metal and are able to diffuse into the negative electrode 50, thereby lithiating the negative electrode 50. The lithium ions may react with the porous, one-dimensional $SiO_x$ ($0<x<2$) nanorods 26' to form porous, one-dimensional silicide nanorods 26". When pre-lithiation is complete, the lithiated negative electrode 50 may be rinsed to remove any remaining pre-lithiation electrolyte, and then may be used in the lithium-sulfur battery 500 (FIG. 5).

Referring now to FIG. 4, the lithium ion battery 400 is depicted. The lithium ion battery 400 shown in FIG. 4 includes the negative electrode 50' with the active material being the porous, one-dimensional $SiO_x$ ($0<x<2$) nanorods 26'.

As shown in FIG. 4, the lithium ion battery 400 includes, in addition to the negative electrode 50' and the negative side current collector 36, a positive electrode 40, a positive-side current collector 38, and a porous separator 42 positioned between the negative electrode 50' and the positive electrode 40.

In FIG. 4, the positive electrode 40 may be formed from any lithium-based active material that can sufficiently undergo lithium insertion and deinsertion while aluminum or another suitable current collector 38 is functioning as the positive terminal of the lithium ion battery 400. One common class of known lithium-based active materials suitable for the positive electrode 40 includes layered lithium transitional metal oxides. Some specific examples of the lithium-based active materials include spinel lithium manganese oxide ($LiMn_2O_4$), lithium cobalt oxide ($LiCoO_2$), a nickel-manganese oxide spinel [$Li(Ni_{0.5}Mn_{1.5})O_2$], a layered nickel-manganese-cobalt oxide [$Li(Ni_xMn_yCo_z)O_2$ or $Li(Ni_xMn_yCo_z)O_4$, or a lithium iron polyanion oxide, such as lithium iron phosphate ($LiFePO_4$) or lithium iron fluoro-phosphate ($Li_2FePO_4F$). Other lithium-based active materials may also be utilized, such as $LiNi_xM_{1-x}O_2$ (M is composed of any ratio of Al, Co, and/or Mg), aluminum stabilized lithium manganese oxide spinel ($Li_xMn_{2-x}Al_yO_4$), lithium vanadium oxide ($LiV_2O_5$), $Li_2MSiO_4$ (M is composed of any ratio of Co, Fe, and/or Mn), $xLi_2MnO_{3-(1-x)}LiMO_2$ (M is composed of any ratio of Ni, Mn and/or Co), and any other high efficiency nickel-manganese-cobalt material. By "any ratio" it is meant that any element may be present in any amount. So, for example M could be Al, with or without Co and/or Mg, or any other combination of the listed elements.

The lithium-based active material of the positive electrode 40 may be intermingled with the polymeric binder 34 and the high surface area carbon (i.e., conductive filler 32). Some examples of suitable binders include polyvinylidene fluoride (PVdF), an ethylene propylene diene monomer (EPDM) rubber, water-based sodium alginate and/or carboxymethyl cellulose (CMC)). The polymeric binder 34 structurally holds the lithium-based active materials and the high surface area carbon together. An example of the high surface area carbon is acetylene black. The high surface area carbon ensures electron conduction between the positive-side current collector 38 and the active material particles of the positive electrode 40.

The positive-side current collector 38 may be formed from aluminum or any other appropriate electrically conductive material known to skilled artisans.

The porous separator 42 in FIG. 4, which operates as both an electrical insulator and a mechanical support, is sandwiched between the negative electrode 50' and the positive electrode 40 to prevent physical contact between the two electrodes 50', 40 and the occurrence of a short circuit. In addition to providing a physical barrier between the two electrodes 50', 40, the porous separator 42 ensures passage of lithium ions (identified by the black dots and by the open circles having a (+) charge in FIG. 4) and related anions (identified by the open circles having a (−) charge in FIG. 4) through an electrolyte solution filling its pores. This helps ensure that the lithium ion battery 400 functions properly.

The porous separator 42 may be a polyolefin membrane. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement, including those of a block copolymer or a random copolymer. The same holds true if the polyolefin is a heteropolymer derived from more than two monomer constituents. As examples, the polyolefin membrane may be formed of polyethylene (PE), polypropylene (PP), a blend of PE and PP, or multi-layered structured porous films of PE and/or PP.

In other examples, the porous separator 42 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany), ZENITE® (DuPont, Wilmington, Del.), poly(p-hydroxybenzoic acid), polyaramides, polyphenylene oxide, and/or combinations thereof. In yet another example, the porous separator 42 may be chosen from a combination of the polyolefin (such as PE and/or PP) and one or more of the polymers listed above.

The porous separator 42 may contain a single layer or a multi-layer laminate fabricated from either a dry or wet process. For example, a single layer of the polyolefin and/or other listed polymer may constitute the entirety of the porous separator 42. As another example, however, multiple discrete layers of similar or dissimilar polyolefins and/or polymers may be assembled into the porous separator 42. In one example, a discrete layer of one or more of the polymers may be coated on a discrete layer of the polyolefin to form the porous separator 42. Further, the polyolefin (and/or other polymer) layer, and any other optional polymer layers, may further be included in the porous separator 42 as a fibrous layer to help provide the porous separator 42 with appropriate structural and porosity characteristics. Still other suitable porous separators 42 include those that have a ceramic layer attached thereto, and those that have ceramic filler in the polymer matrix (i.e., an organic-inorganic composite matrix).

Any appropriate electrolyte solution that can conduct lithium ions between the negative electrode 50' and the positive electrode 40 may be used in the lithium ion battery 400. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 400 as well as how to manufacture or commercially acquire them. Examples of lithium salts that may be dissolved in an organic solvent to form the non-aqueous liquid electrolyte solution include $LiClO_4$, $LiAlCl_4$, $LiI$, $LiBr$, $LiSCN$, $LiBF_4$, $LiB(C_6H_5)_4$, $LiCF_3SO_3$, $LiN(FSO_2)_2$ (LIFSI), $LiN(CF_3SO_2)_2$ (LITFSI), $LiAsF_6$, $LiPF_6$, $LiB(C_2O_4)_2$ (LiBOB), $LiBF_2(C_2O_4)$ (LiODFB), $LiPF_4(C_2O_4)$ (LiFOP), $LiNO_3$, and mixtures thereof. These and other similar lithium salts may be dissolved in a variety of organic solvents, such as cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran,1,3-dioxolane), and mixtures thereof.

As shown in FIG. 4, the lithium ion battery 400 also includes an interruptible external circuit 46 that connects the negative electrode 50' and the positive electrode 40. The lithium ion battery 400 may also support a load device 44 that can be operatively connected to the external circuit 46. The load device 44 receives a feed of electrical energy from the electric current passing through the external circuit 46 when the lithium ion battery 400 is discharging. While the load device 44 may be any number of known electrically-powered devices, a few specific examples of a power-consuming load device 44 include an electric motor for a hybrid vehicle or an all-electrical vehicle, a laptop computer, a cellular phone, and a cordless power tool. The load device 44 may also, however, be an electrical power-generating apparatus that charges the lithium ion battery 400 for purposes of storing energy. For instance, the tendency of windmills and solar panels to variably and/or intermittently generate electricity often results in a need to store surplus energy for later use.

The lithium ion battery 400 may also include a wide range of other components that, while not depicted here, are nonetheless known to skilled artisans. For instance, the lithium ion battery 400 may include a casing, gaskets, terminals, tabs, and any other desirable components or materials that may be situated between or around the negative electrode 50' and the positive electrode 40 for performance-related or other practical purposes. Moreover, the size and shape of the lithium ion battery 400, as well as the design and chemical make-up of its main components, may vary depending on the particular application for which it is designed. Battery-powered automobiles and hand-held consumer electronic devices, for example, are two instances where the lithium ion battery 400 would most likely be designed to different size, capacity, and power-output specifications. The lithium ion battery 400 may also be connected in series and/or in parallel with other similar lithium ion batteries to produce a greater voltage output and current (if arranged in parallel) or voltage (if arranged in series) if the load device 44 so requires.

The lithium ion battery 400 generally operates by reversibly passing lithium ions between the negative electrode 50' and the positive electrode 40. In the fully charged state, the voltage of the battery 400 is at a maximum (typically in the range 2.0V to 5.0V); while in the fully discharged state, the voltage of the battery 400 is at a minimum (typically in the range 0V to 2.0V). Essentially, the Fermi energy levels of the active materials in the positive and negative electrodes 40, 50' change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 44 enables an electronic current flow in the external circuit 46 with a direction such that the difference between the Fermi levels (and, correspondingly, the cell voltage) decreases. The reverse happens during battery charging: the battery charger forces an electronic current flow in the external circuit 46 with a direction such that the difference between the Fermi levels (and, correspondingly, the cell voltage) increases.

At the beginning of a discharge, the negative electrode 50' of the lithium ion battery 400 contains a high concentration of intercalated lithium while the positive electrode 40 is relatively depleted. When the negative electrode 50' contains a sufficiently higher relative quantity of intercalated lithium, the lithium ion battery 400 can generate a beneficial electric current by way of reversible electrochemical reactions that occur when the external circuit 46 is closed to connect the negative electrode 50' and the positive electrode 40. The establishment of the closed external circuit under such circumstances causes the extraction of intercalated lithium from the negative electrode 50'. The extracted lithium atoms are split into lithium ions (identified by the black dots and by the open circles having a (+) charge) and electrons ($e^-$) as they leave an intercalation host at the negative electrode-electrolyte interface.

The chemical potential difference between the positive electrode 40 and the negative electrode 50' (ranging from about 2.0V to about 5.0V, depending on the exact chemical make-up of the electrodes 50', 40) drives the electrons ($e^-$) produced by the oxidation of intercalated lithium at the negative electrode 50' through the external circuit 46 towards the positive electrode 40. The lithium ions are concurrently carried by the electrolyte solution through the porous separator 42 towards the positive electrode 40. The electrons ($e^-$) flowing through the external circuit 46 and the lithium ions migrating across the porous separator 42 in the electrolyte solution eventually reconcile and form intercalated lithium at the positive electrode 40. The electric current passing through the external circuit 46 can be harnessed and directed through the load device 44 until the level of intercalated lithium in the negative electrode 50' falls below a workable level or the need for electrical energy ceases.

The lithium ion battery 400 may be recharged after a partial or full discharge of its available capacity. To charge the lithium ion battery 400 an external battery charger is connected to the positive and the negative electrodes 40, 50', to drive the reverse of battery discharge electrochemical reactions. During recharging, the electrons ($e^-$) flow back towards the negative electrode 50' through the external circuit 46, and the lithium ions are carried by the electrolyte across the porous separator 42 back towards the negative electrode 50'. The electrons (e⁻) and the lithium ions are reunited at the negative electrode 50', thus replenishing it with intercalated lithium for consumption during the next battery discharge cycle.

The external battery charger that may be used to charge the lithium ion battery 400 may vary depending on the size, construction, and particular end-use of the lithium ion battery 400. Some suitable external battery chargers include a battery charger plugged into an AC wall outlet and a motor vehicle alternator.

Referring now to FIG. 5, the lithium-sulfur battery 500 includes the positive electrode 40' with the porous, one-dimensional $SiO_2$ nanorods 26 as an additive. The lithium-sulfur battery 500 also includes the negative electrode 50, the negative side current collector 36, a positive-side current collector 38, and a porous separator 42 positioned between the negative electrode 50 and the positive electrode 40'.

It is to be understood that the porous separator 42 may be the same type of porous separator 42 that is used in a lithium ion battery 400 described herein. In addition, the negative current collector 36 and positive current collector 38 described herein for the lithium ion battery 400 may also be used in the lithium-sulfur battery 500.

For the lithium-sulfur battery 500, the electrolyte solution includes an ether based solvent and a lithium salt dissolved in the ether based solvent. Examples of the ether based solvent include cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof. Examples of the lithium salt include $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$ (LIFSI), $LiN(CF_3SO_2)_2$ (LITFSI), $LiB(C_2O_4)_2$ (LiBOB), $LiBF_2(C_2O_4)$ (LiODFB), $LiPF_4(C_2O_4)$ (LiFOP), $LiNO_3$, $LiPF_6$, and mixtures thereof.

For the lithium-sulfur battery 500, the negative electrode 50 may include any active material that can sufficiently provide a lithium source for lithium redox reactions that does not react with the current collector. In an example, the current collector may be copper or another suitable current collector functioning as the negative terminal of the lithium-sulfur battery 500. Examples of active materials include the porous, one-dimensional silicide nanorods 26" (as shown in FIG. 5), lithium metal (alone or encapsulated in carbon) or lithiated silicon. The other components of the negative electrode 50 were previously described in reference to FIG. 3.

The positive and negative electrodes 40', 50 are in contact, respectively, with the current collectors 38, 36. The negative-side current collector 36 collects and moves free electrons to and from the external circuit 46. The positive-side current collector 38 collects and moves free electrons to and from the external circuit 46.

The lithium-sulfur battery 500 may support a load device 44 that can be operatively connected to the external circuit 46. The load device 44 receives a feed of electrical energy from the electric current passing through the external circuit 46 when the lithium-sulfur battery 400 is discharging. While the load device 44 may be any number of known electrically-powered devices, a few specific examples of a power-consuming load device include an electric motor for a hybrid vehicle or an all-electrical vehicle, a laptop computer, a cellular phone, and a cordless power tool. The load device 44 may also, however, be an electrical power-generating apparatus that charges the lithium-sulfur battery 500 for purposes of storing energy. For instance, the tendency of windmills and solar panels to variably and/or intermittently generate electricity often results in a need to store surplus energy for later use.

The lithium-sulfur battery 500 can include a wide range of other components that, while not depicted here, are nonetheless known to skilled artisans. For instance, the lithium-sulfur battery 500 may include a casing, gaskets, terminals, tabs, and any other desirable components or materials that may be situated between or around the negative electrode 50 and the positive electrode 40' for performance-related or other practical purposes. Moreover, the size and shape of the lithium-sulfur battery 500, as well as the design and chemical make-up of its main components, may vary depending on the particular application for which it is designed. Battery-powered automobiles and hand-held consumer electronic devices, for example, are two instances where the lithium-sulfur battery 500 would most likely be designed to different size, capacity, and power-output specifications. The lithium-sulfur battery 500 may also be connected in series and/or in parallel with other similar lithium-sulfur batteries 500 to produce a greater voltage output and current (if arranged in parallel) or voltage (if arranged in series) if the load device 44 so requires.

The lithium-sulfur battery 500 can generate a useful electric current during battery discharge (shown by reference numeral 48 in FIG. 5). During discharge, the chemical processes in the battery 500 include lithium ($Li^+$) dissolution from the surface of the negative electrode 50 and incorporation of the lithium cations into alkali metal polysulfide salts (i.e., $Li_2S$) in the positive electrode 40'. As such, polysulfides are formed (sulfur is reduced) on the surface of the positive electrode 40' in sequence while the battery 500 is discharging. The chemical potential difference between the positive electrode 40' and the negative electrode 50 (ranging from approximately 1.5 to 3.0 volts, depending on the exact chemical make-up of the electrodes 50, 40') drives electrons produced by the dissolution of lithium at the negative electrode 50 through the external circuit 46 towards the positive electrode 40'. The resulting electric current passing through the external circuit 46 can be harnessed and directed through the load device 44 until the lithium in the negative electrode 50 is depleted and the capacity of the lithium-sulfur battery 500 is diminished.

The lithium-sulfur battery 500 can be charged or re-powered at any time by applying an external power source to the lithium-sulfur battery 500 to reverse the electrochemical reactions that occur during battery discharge. During charging (shown at reference numeral 49 in FIG. 5), lithium plating to the negative electrode 50 takes place, and sulfur formation at the positive electrode 40' takes place. The connection of an external power source to the lithium-sulfur battery 500 compels the otherwise non-spontaneous oxidation of lithium at the positive electrode 40' to produce electrons and lithium ions. The electrons, which flow back towards the negative electrode 50 through the external circuit 46, and the lithium ions ($Li^+$), which are carried by the electrolyte across the porous membrane 42 back towards the negative electrode 50, reunite at the negative electrode 50 and replenish it with lithium for consumption during the next battery discharge cycle. The external power source that may be used to charge the lithium-sulfur battery 500 may vary depending on the size, construction, and particular end-use of the lithium-sulfur battery 500. Some suitable external power sources include a battery charger plugged into an AC wall outlet and a motor vehicle alternator.

To further illustrate the present disclosure, examples are given herein. It is to be understood that these examples are provided for illustrative purposes and are not to be construed as limiting the scope of the disclosure.

EXAMPLES

Example 1

$SiO_x$ porous nanorods were prepared according to an example disclosed herein. A precipitate of $H_4SiO_4$ was prepared by adding $Na_2SiO_3.6H_2O$ and 1M HCl was added to deionized water. The $H_2SiO_3$ precipitate was filtered, washed, and dried.

An amount of about 3 grams of $H_4SiO_4$ nanoparticles having an average diameter ranging from about 30 nm to about 200 nm was added to 20 mL of deionized water, 60 mL of 1M NaOH, and 0.03 grams of hollow carbon to form a solution with the hollow carbon dispersed therein. The solution was introduced into a TEFLON®-lined stainless steel autoclave. The processing parameters for hydrothermal synthesis included exposing the solution to a temperature of 200° C. for about 24 hours. It is believed that the pressure in the autoclave was about 1000 psi during hydrothermal synthesis. At the end of the 24 hour period, the reaction product was removed from the autoclave. An ion-exchange was performed on the reaction product using 1M HCl solution until a pH of about 7 was obtained. After ion-exchange, the reaction product was filtered, washed, and dried to obtain the precursor nanostructure, $SiO_x$ petals/nanorods. The precursor nanostructure included the $SiO_x$ petals/nanorods assembled together as a sea urchin-like nanostructure, where each $SiO_x$ petal/nanorod hag an average length ranging from 200 nm to about 5 μm, and an average diameter ranging from about 20 nm to about 200 nm.

The sea urchin-like nanostructures with the hollow carbon composites were then exposed to annealing at 1000° C. for about 3 hours in a reducing environment of 10% $H_2$ and 90% Ar gas. During the heat treatment, the hollow carbon was removed, the $SiO_x$ petals were further reduced to some form of $SiO_x$, where x<2. The removed hollow carbon is oxidized to form carbon monoxide gas, which was also generated as a side product during the heat treatment. The reactions during annealing were shown in reactions (V) and (VI) described herein.

The porous silicon or porous $SiO_x$ nanorods formed during annealing may or may not be heated in an oxygen-containing environment (e.g., air). During this treatment, the silicon or $SiO_x$ would be oxidized to form $SiO_x$ (0<x≤2) (e.g., $2Si+xO_2 \rightarrow 2SiO_x$ (0<x≤2)). If the porous, one-dimensional $SiO_x$ nanorods are being used as an active material in the negative electrode of a lithium-sulfur or lithium ion battery, this heat treatment is not desirable because $SiO_x$ is a suitable active material. If the porous, one-dimensional $SiO_x$ nanorods are being used as an additive in the positive electrode, the $SiO_x$ would be oxidized until $SiO_2$ is formed. In this particular example, the resulting product was porous $SiO_x$ nanorods, where 0<x<2, and this product was not exposed to additional heating. Therefore the porous, one-dimensional $SiO_x$ nanorods were used as an active material in a negative electrode. The $SiO_x$ nanorods were confirmed through Raman spectroscopy.

A TEM image was taken of the porous $SiO_x$ nanorods 26'. These are shown in FIGS. 6 and 7, which clearly illustrate the morphology of porous, one-dimensional nanorods 26'. As shown in FIG. 6, the porous $SiO_x$ petals/nanorods 26' are connected together, and resemble a sea urchin. The dimensions of the porous, one-dimensional nanorods 26' may be measured using the TEM image.

Figure 8:
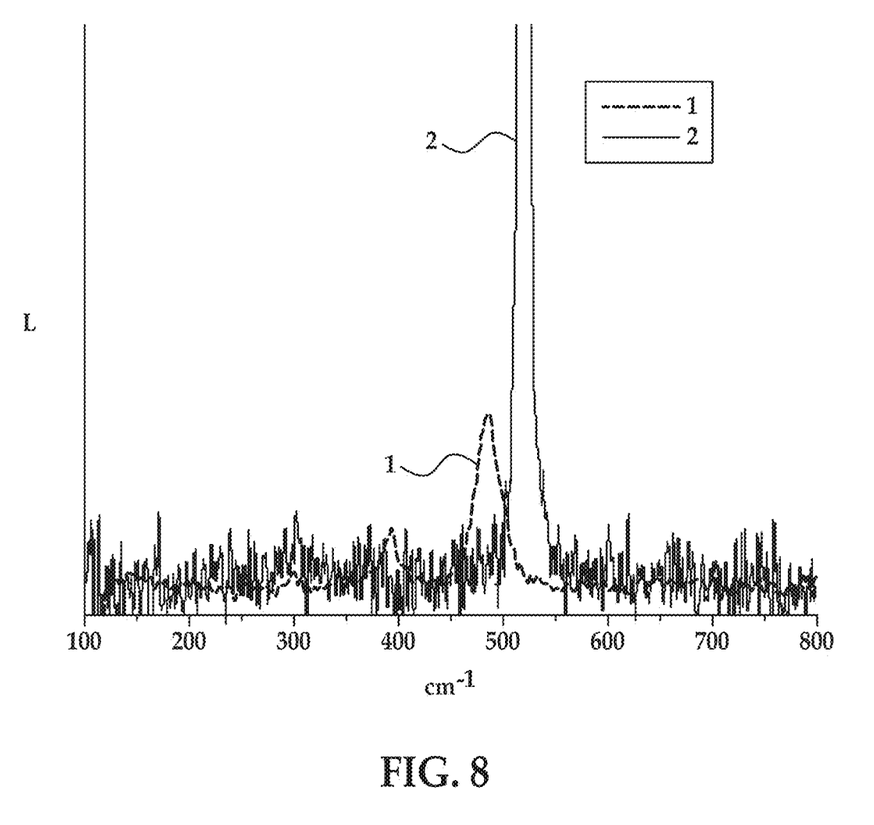
FIG. 8 is the Raman spectra of an example of the porous, one-dimensional $SiO_x$ nanorods and a comparative silicon wafer.

Ramen spectroscopy results were obtained for the porous, one-dimensional $SiO_x$ nanorods 26' (labeled 1), and for a pure silicon wafer (labeled 2) for comparison. These results are shown in FIG. 8. FIG. 8 depicts the diffracted intensity (counts) (Y axis labeled "L") versus the wavenumber ($cm^{-1}$) (X axis labeled as "$cm^{-1}$"). The graph shows the presence of $SiO_x$, as the line has shifted from the pure silicon results. The value of x in $SiO_x$ may be determined using neutron diffraction.

Example 2

The porous, one-dimensional $SiO_x$ nanorods of Example 1 were incorporated as the active material into a negative electrode. The example negative electrode included about 60% of the active material, about 20% of a binder, and about 20% of a conductive filler.

To form the example negative electrode, the respective components were mixed in deionized water, to form a dispersion/mixture. Specifically, the dispersion/mixture contained about 120 mg of the porous, one-dimensional $SiO_x$ nanorods as the active material, 40 mg of sodium alginate as the binder, 40 mg of Super P®Li carbon black as the conductive filler, and 2.5 g (or 2.5 mL) of deionized water. The dispersions/mixtures were manually ground and then mixed with a rotator mixer at 2000 rpm for 20 minutes to form a coatable slurry. The slurry was coated using a doctor's blade coating machine on a copper current collector. The electrode coating was dried overnight at room temperature in air and then dried in vacuum at about 60° C. for about 30 minutes.

The example negative electrode was used with a lithium metal positive electrode to construct lithium ion battery half cells. Coin cells (2032 hardware) were assembled inside an Ar-filled glovebox. Microporous tri-layered polypropylene (PP) and polyethylene (PE) polymer membranes (Celgard 2032, available from Celgard) was used as the separator. 1 M $LiPF_6$ in a mixed solution of ethylene carbonate (EC) and diethyl carbonate (DEC) (1:1 volume ratio, Novolyte, USA) with 10 wt % fluoroethylene carbonate (FEC) as the additive was used as the electrolyte.

The coin cells were held at 30° C. to perform electrochemical cycling tests. The cycling tests were carried out at a rate of C/10 and were cycled within the voltage window of 0.5V to 1V vs. Li/Li' for at least 80 cycles.

Figure 9:
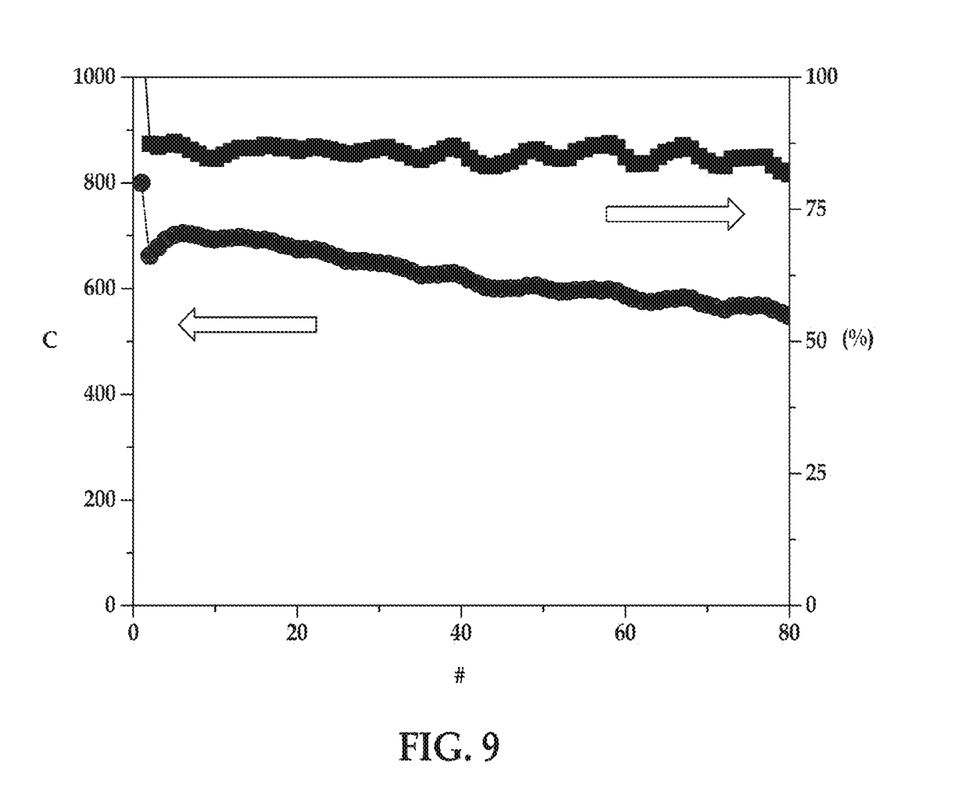
FIG. 9 is a graph exhibiting the discharge capacity (mAh/g, left Y axis) and the coulombic efficiency (%, right Y axis) versus the cycle number for an example lithium ion battery including a negative electrode with the porous, one-dimensional $SiO_x$ nanorods as the active material.

FIG. 9 depicts the discharge capacity (mAh/g) (Y axis labeled "C" on the left side) versus the cycle index (X axis labeled "#") for the coin cell. The coulombic efficiency (%) (Y axis labeled "%" on the right side) for the coin cell is also shown in FIG. 9. The discharge capacity (solid circles) of the coin cell with the example negative electrode was above 500 mAh/g through 80 cycles. Additionally, the coulombic efficiency (solid squares) of the coin cell with the example negative electrode was above 75% through 80 cycles. These results indicate that the porous, one-dimensional $SiO_x$ nanorods operate as a suitable active material for a lithium ion battery.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 30 nm to about 200 nm should be interpreted to include not only the explicitly recited limits of from about 30 nm to about 200 nm, but also to include individual values, such as 35 nm, 60 nm, 165.5 nm, etc., and sub-ranges, such as from about 40 nm to about 155 nm, etc. Furthermore, when "about" is utilized to describe a value, this is meant to encompass minor variations (up to +/−5%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A method, comprising:
   reacting an $SiO_x$ precursor with an acid to form a precipitate in an aqueous mixture;
   adding the precipitate and a base to water;
   reacting the precipitate with the base to form a water-soluble compound;
   dissolving the water-soluble compound in the water to form a solution;
   adding a carbon material to the solution so that the solution has the carbon material therein;
   performing hydrothermal synthesis using the solution, thereby growing $SiO_x$ precursor nanostructures on the carbon material, wherein the hydrothermal synthesis is performed in a closed system at a temperature of greater than or equal to about 150° C. to less than or equal to about 200° C. and a vapor pressure of greater than or equal to about 700 psi to less than or equal to about 1380 psi; and
   annealing the precursor nanostructures on the carbon material, thereby removing the carbon material to form porous $SiO_x$ (0<x≤2) nanorods.

2. The method as defined in claim 1 wherein the precipitate is $Si(OH)_4$.

3. The method as defined in claim 1 wherein annealing is performed in an inert or reducing environment so that porous $SiO_x$ nanorods have (0<x<2), and wherein the method further comprises:
   adding the porous $SiO_x$ nanorods, as an active material, to a negative electrode composition of a lithium ion battery;
   applying the negative electrode composition onto a current collector to form a negative electrode; and
   pre-lithiating the negative electrode, thereby forming porous silicide nanorods.

4. The method as defined in claim 1 wherein annealing is performed in an oxygen-containing environment so that porous $SiO_2$ nanorods are formed, and wherein the method further comprises adding the porous $SiO_2$ nanorods, as an additive, to a positive electrode composition of a lithium-sulfur battery.

5. The method as defined in claim 1, further comprising:
   removing the precursor nanostructures and any liquid present after the hydrothermal synthesis from a closed system prior to the annealing of the precursor nanostructures;
   wherein the annealing of the precursor nanostructures includes:
     placing the precursor nanostructures in any of an inert environment or a reducing environment; and
     applying a heat treatment at a temperature ranging from about 800° C. to about 1100° C. for a time ranging from about 2 hours to about 5 hours, thereby forming the porous $SiO_x$ nanorods, wherein 0<x<2.

6. The method as defined in claim 1, wherein the annealing of the precursor nanostructures occurs by applying a heat treatment in an oxygen-containing environment at a temperature ranging from about 350° C. to about 700° C. for a time ranging from about 2 hours to about 5 hours, thereby forming porous $SiO_2$ nanorods.

7. The method as defined in claim 1, wherein the carbon material is hollow carbon or graphite.

8. A method, comprising:
   forming a precipitate in an aqueous mixture by mixing an $SiO_x$ precursor and an acid;
   adding the precipitate and a carbon material to a base, thereby dissolving the precipitate to form a solution having the carbon material therein;
   performing hydrothermal synthesis using the solution, thereby growing precursor nanostructures on the carbon material;
   removing the precursor nanostructures and any liquid present after the hydrothermal synthesis from a closed system;
   annealing the precursor nanostructures on the carbon material, thereby removing the carbon material to form porous $SiO_x$ (0<x≤2) nanorods, wherein the annealing of the precursor nanostructures includes:
     placing the precursor nanostructures in any of an inert environment or a reducing environment; and
     applying a heat treatment at a temperature ranging from about 800° C. to about 1100° C. for a time ranging from about 2 hours to about 5 hours, thereby forming the porous $SiO_x$ nanorods, wherein 0<x<2;
   removing the porous $SiO_x$ nanorods, wherein 0<x<2, from the any of the inert environment or the reducing environment; and one of
   i) adding the porous $SiO_x$ nanorods, as an active material, to a negative electrode composition of a lithium ion battery; or
   ii) adding the porous $SiO_x$ nanorods, as an active material, to a negative electrode composition of a lithium-sulfur battery; and
   pre-lithiating the negative electrode of the lithium-sulfur battery, thereby forming porous silicide nanorods.

9. The method as defined in claim 8 wherein the precipitate is $Si(OH)_4$.

10. The method as defined in claim 8 wherein the hydrothermal synthesis includes subjecting the solution to heat and vapor pressure in a closed system, thereby causing the growth of the precursor nanostructures on the carbon material.

11. The method as defined in claim 8, wherein the carbon material is hollow carbon or graphite.

* * * * *